United States Patent
Fischer et al.

(10) Patent No.: US 6,994,401 B1
(45) Date of Patent: Feb. 7, 2006

(54) SEAT BACKREST COVER MODULE

(75) Inventors: Harald Fischer, Unterensingen (DE);
Hans Jorg Walk, Reutlingen (DE);
Volker Schumm, Ditzingen (DE);
Bernd Rager, Bissingen (DE)

(73) Assignee: Lear Corporation, Southfield, MI (US)

( * ) Notice: Subject to any disclaimer, the term of this patent is extended or adjusted under 35 U.S.C. 154(b) by 747 days.

(21) Appl. No.: 09/947,937

(22) Filed: Sep. 6, 2001

Related U.S. Application Data
(60) Provisional application No. 60/232,525, filed on Sep. 14, 2000.

(51) Int. Cl.
A47C 7/02 (2006.01)

(52) U.S. Cl. .............. 297/452.14; 297/452.18; 297/452.56; 297/188.04; 297/188.07; 297/146; 297/147; 297/163; 297/217.6

(58) Field of Classification Search ............... 297/146, 297/147, 163, 188.04, 188.07, 217.6, 452.14, 297/DIG. 2, 452.18, 452.56, 452.63, 452.44, 297/452.55, 440.11, 45
See application file for complete search history.

(56) References Cited

U.S. PATENT DOCUMENTS

| | | | | |
|---|---|---|---|---|
| 2,015,315 A | * | 9/1935 | Mcmackin | 297/146 |
| 2,136,407 A | * | 11/1938 | Armour | 297/188.07 |
| 2,509,451 A | * | 5/1950 | Reinholz | 297/440.11 X |
| 2,619,395 A | * | 11/1952 | Kent | 297/146 |
| 2,812,146 A | * | 11/1957 | Chaplin | 297/452.63 X |
| 2,963,078 A | * | 12/1960 | Ferrelle | 297/146 |
| 3,009,737 A | * | 11/1961 | Burnett | 297/146 |
| 3,019,050 A | | 1/1962 | Spielman | 297/188.04 |
| 3,165,308 A | * | 1/1965 | Rathbun | 297/452.56 |
| 3,179,469 A | * | 4/1965 | Heuston | 297/452.56 |
| 3,248,150 A | * | 4/1966 | Lilienfeld | 297/440.11 |
| 3,333,841 A | * | 8/1967 | Damiano | 297/452.56 |
| 3,389,742 A | * | 6/1968 | Cernuschi | 297/452.56 |
| 3,502,316 A | * | 3/1970 | Saether | 297/452.56 |
| 3,643,997 A | * | 2/1972 | Gilbert et al. | 297/440.11 |
| 3,695,707 A | * | 10/1972 | Barecki et al. | 297/452.55 |
| 3,758,157 A | | 9/1973 | Fries | |
| 3,758,159 A | | 9/1973 | Morris | |
| 4,169,628 A | | 10/1979 | Wolf et al. | |
| 4,246,734 A | | 1/1981 | Fogle, Jr. et al. | |
| 4,519,648 A | * | 5/1985 | Jovanovic | 297/146 |
| 4,526,421 A | | 7/1985 | Brennan et al. | |
| 4,556,254 A | | 12/1985 | Roberts | |
| 4,792,183 A | * | 12/1988 | Townsend, III | 297/146 X |
| 4,793,607 A | | 12/1988 | Suellentrop | |
| 4,836,602 A | * | 6/1989 | D'Alamda Remedios et al. | 297/146 X |
| 4,869,554 A | * | 9/1989 | Abu-Isa et al. | 297/452.56 |
| 4,913,487 A | * | 4/1990 | Breckel et al. | 297/147 X |
| 5,004,295 A | * | 4/1991 | Inoue | 297/188.07 |
| 5,029,942 A | | 7/1991 | Rink | |
| 5,100,204 A | | 3/1992 | Makihara et al. | |
| 5,236,247 A | | 8/1993 | Hewko | |
| 5,360,258 A | * | 11/1994 | Alivizatos | 297/440.11 |
| 5,370,060 A | * | 12/1994 | Wang | 297/163 X |
| 5,389,177 A | | 2/1995 | Shuert | |
| 5,415,457 A | * | 5/1995 | Kifer | 297/188.04 |
| 5,487,591 A | | 1/1996 | Knoblock | 297/452.14 |
| 5,492,257 A | * | 2/1996 | Demick | 297/188.04 X |
| 5,609,395 A | * | 3/1997 | Burch | 297/452.55 |
| 5,720,515 A | | 2/1998 | Haffner | 297/163 X |
| 5,813,354 A | * | 9/1998 | Scott | 297/146 X |

(Continued)

*Primary Examiner*—Rodney B. White
(74) *Attorney, Agent, or Firm*—Bill C. Panagos

(57) ABSTRACT

A seat assembly includes a seat back frame having a pair of spaced apart side rails. A cover is fastened to the frame and extends between the pair of side rails. A rigid cross member is preferably integrally molded in an upper portion of the cover. The cover and the cross member cooperate to provide structural rigidity to the seat back frame.

15 Claims, 4 Drawing Sheets

U.S. PATENT DOCUMENTS

| | | | |
|---|---|---|---|
| 5,863,092 A | | 1/1999 | Kifer ...................... 297/188.04 |
| 5,878,672 A | * | 3/1999 | Ostermann et al. ..... 297/163 X |
| 5,947,033 A | | 9/1999 | Lombardo .............. 297/163 X |
| 5,984,347 A | * | 11/1999 | Blanc-rosset ........... 297/146 X |
| 5,988,757 A | | 11/1999 | Vishey et al. ....... 297/452.18 X |
| 6,059,358 A | * | 5/2000 | Demick et al. ......... 297/146 X |
| 6,089,595 A | | 7/2000 | Enders |
| 6,131,993 A | | 10/2000 | Pesta et al. ............ 297/188.04 |
| 6,260,917 B1 | * | 7/2001 | Marechal .................... 297/163 |
| 6,394,551 B1 | * | 5/2002 | Beukema ............. 297/217.6 X |
| 6,428,096 B2 | * | 8/2002 | Reitze .............. 297/188.04 X |
| 2001/0002092 A1 | * | 5/2001 | Reitze .............. 297/188.04 X |
| 2002/0033630 A1 | * | 3/2002 | Takata .................. 297/452.56 |
| 2002/0135211 A1 | * | 9/2002 | Sitzler .................. 297/188.04 |
| 2002/0190564 A1 | * | 12/2002 | Coffield et al. ........ 297/452.56 |

* cited by examiner

SEAT BACKREST COVER MODULE

CROSS REFERENCE TO RELATED APPLICATIONS

This application claims the benefit of U.S. Provisional Application No. 60/232,525 filed Sep. 14, 2000.

BACKGROUND OF THE INVENTION

This invention relates in general to vehicle seats, and in particular to a backrest cover module for a vehicle seat including various vehicle components preassembled on the backrest cover.

Seats for passenger vehicles commonly have a U-shaped structural back frame having a pair of vertical side members joined together by a horizontally extending cross member positioned near the upper portion of the seat back. Often, these back frames are formed from tubular stock material which is bent to form the upper corners of the seat back. These back frames are generally made of metal and are relative expensive and heavy. A lightweight relatively flimsy plastic back cover is commonly used to cover the rear portion of the seat back. These conventional plastic covers are aesthetic in purpose and are fastened to the rigid back frame. The plastic covers provide relatively no additional structural rigidity to the seat back.

Vehicle seats often have various components which are fastened to the rigid back frame. Examples of these components include electronic controls and wiring for a power seat, ventilation components, side airbags, stiffening structures, impact protection components, and electrical connections for accessories. To manufacture the seats, the components are typically assembled on the back frame individually. Lastly, the cover is then attached to the seat back.

BRIEF SUMMARY OF THE INVENTION

This invention relates to a vehicle seat assembly including a frame formed of at least two components made of different materials to provide a relatively strong yet lightweight frame. The seat assembly includes a seat back frame having a pair of spaced apart side rails. A cover is fastened to the frame and extends between the pair of side rails. A rigid cross member is preferably integrally molded in an upper portion of the cover. The cover and the cross member cooperate to provide structural rigidity to the seat back frame.

Various objects and advantages of this invention will become apparent to those skilled in the art from the following detailed description of the preferred embodiment, when read in light of the accompanying drawings.

DETAILED DESCRIPTION OF THE INVENTION

The present invention relates to a backrest cover module which improves the structural integrity of the seat back and reduces the cost of assembling the vehicle seat by providing the backrest cover module with various vehicle components which are pre-assembled on the cover. For example, multiple housings for the plurality of components may be eliminated. The term "pre-assembled" generally means that the components are attached or formed integrally with the backrest cover prior to installation of the cover to the seat frame. The cover can also include an integral structural cross member to provide stiffness for the vehicle seat. Different embodiments of the invention are illustrated in the accompanying drawings.

Figure 1:
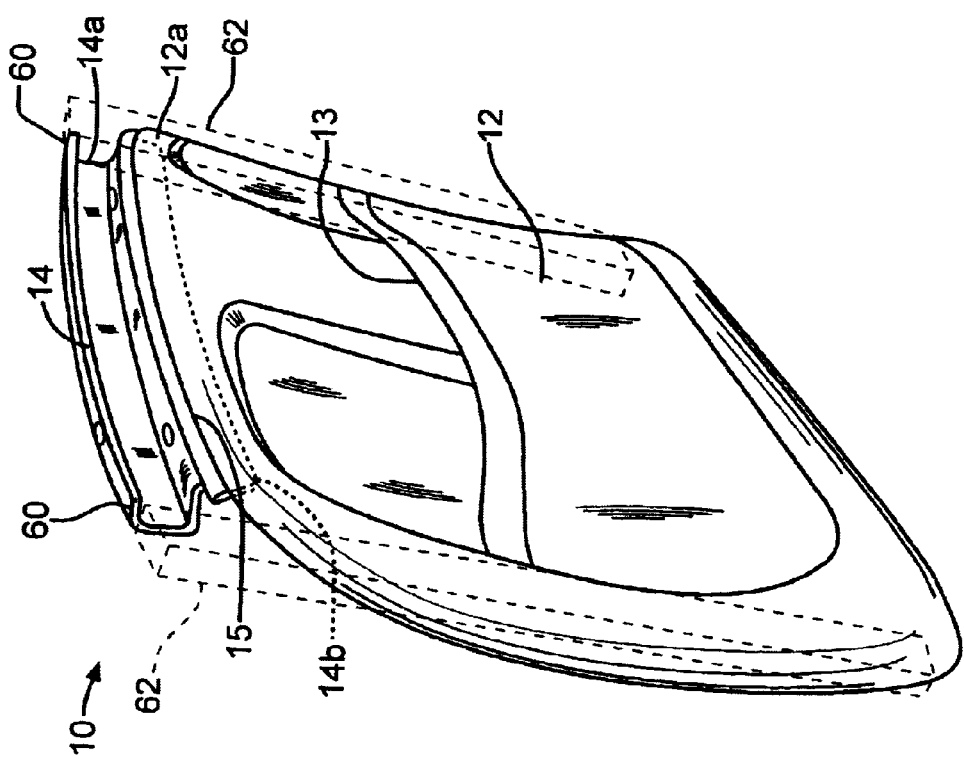
FIG. 1 is a schematic perspective view of a backrest cover module in accordance with the present invention.

There is illustrated in FIG. 1 an embodiment of a backrest cover module, indicated generally at 10, for use in covering a rear portion of a vehicle seat. The module 10 generally includes a backrest cover 12 and cross member 14. The cover 12 can be made of any suitable material which is preferably relatively lightweight, such as plastic or reinforced fiber material or composite. The cross member 14 is preferably made of a rigid material such as metal. Preferably, a portion 14b is integrally molded in an upper portion 12a of the cover 12, such as by an injection molding process. Of course, the cross member 14 could be fastened or attached to the cover 12. The module 10 can be attached to a conventional vehicle seat back frame, as described above in the Background of the invention. Alternatively, the module 10 can be attached to a seat back frame having a relatively weak upper cross member or no cross member at all. Preferably, ends 60 of the cross member 14 are fastened to the generally vertical spaced apart side rails of the seat frame, as indicated schematically at 62 in FIG. 1. The module 10 provides structural rigidity which is particularly desired to increase the strength of the seat during a side impact force. Thus, the module 10 can be used in conventional vehicle seats to increase their performance for side impact forces.

The cross member 14 can have any suitable cross-sectional shape. As shown in FIG. 1, the cross member 14 has a generally C-shaped cross-section defining an opening 14a. Although the orientation of the opening of the C-shaped cross-section is shown opened rearwardly, the cross member 14 could be oriented so that the opening 14a is exposed in the front. The cross member also includes a lower flange portion 15 which is preferably integrally molded into the cover 12. The cover 12 can have any desirable contoured shape and can include other features, for example, a pocket 13.

The module 10 can be used for all of the embodiments described and/or illustrated in this application, and similar reference numbers may be used for similar structures.

Figure 2:
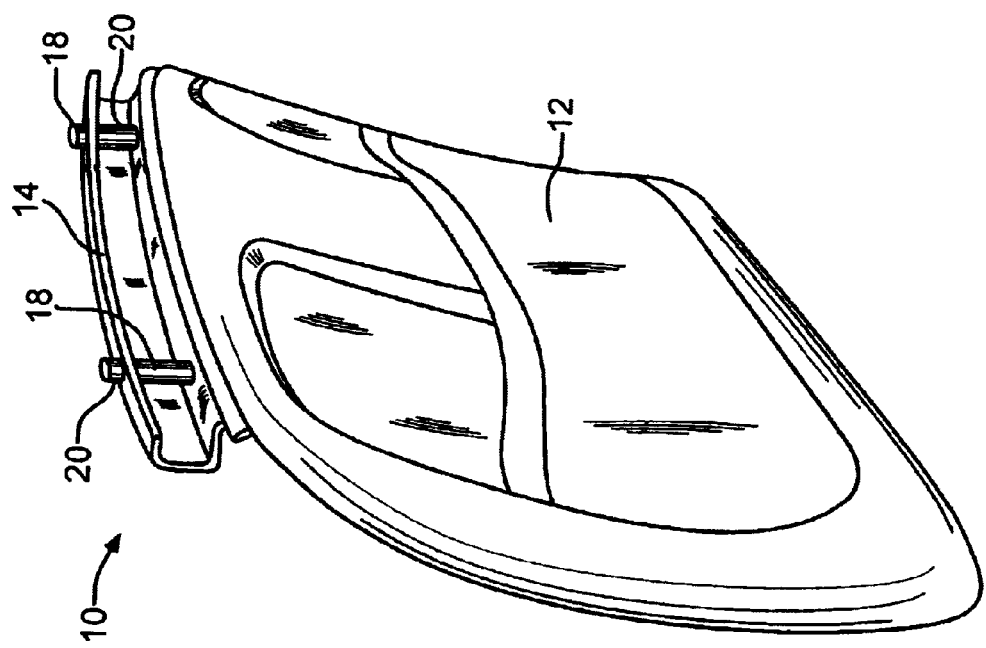
FIG. 2 is a schematic perspective view of the backrest cover module of FIG. 1 further including guides mounted within the cross member.

As shown in FIG. 2, the cross member 14 can be formed with tubular guides 18 disposed in openings 20 formed in the cross member 14. The pins 18 provide mounting locations for a pair of mounting posts of a headrest (not shown). The posts of the headrests are inserted through the pins 18 (or just the openings 20). Thus, the cross member 14 can provide structural reinforcement for the mounting of the headrest.

Figure 3:
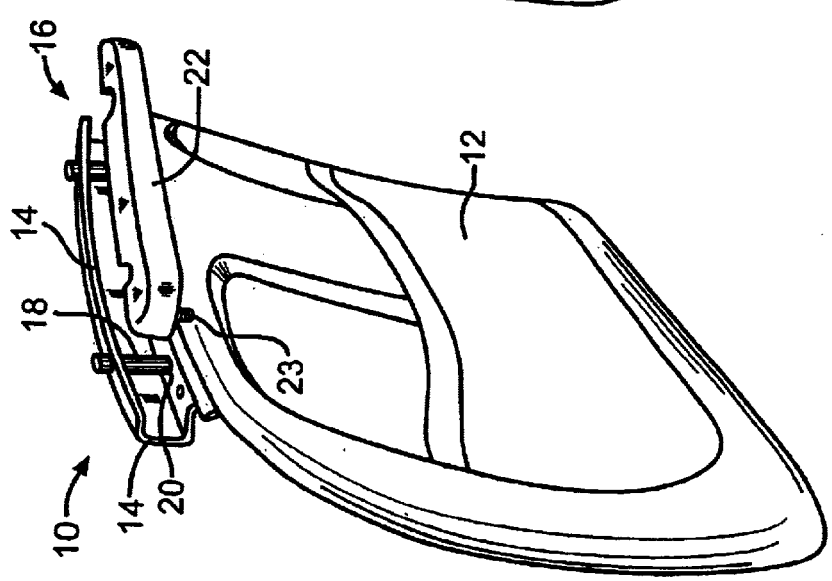
FIG. 3 is a schematic perspective view of the backrest cover module of FIG. 2 further including a bladder 22.

There is illustrated in FIG. 3, an exploded view of the module 10 having a reservoir bladder 22 housed within the opening 14a of the cross member 14. The bladder 22 can be used to store a volume of fluid or air for use with hydraulic or pneumatic seat components, such as lumbar supports, side bolsters, and power seat mechanisms. The space within the opening 14a is ideally suited for the storage of the bladder 22, since this space is generally not useable for other components due to its generally narrow and elongated size. There is a current trend that modem seats are being equipped with larger number of components and space requirements to house these components are becoming scarce. The bladder 22 can be equipped with an access port 23. The bladder 22 can be made of any suitable material, such as plastic, and formed by any suitable process, such as a blow molding process. As shown in FIG. 3, the bladder 22 can be formed into any desirable shape to fit within the opening 14a, such as for example, with a pair of recesses 22a to accommodate the guides 18.

Figure 4:
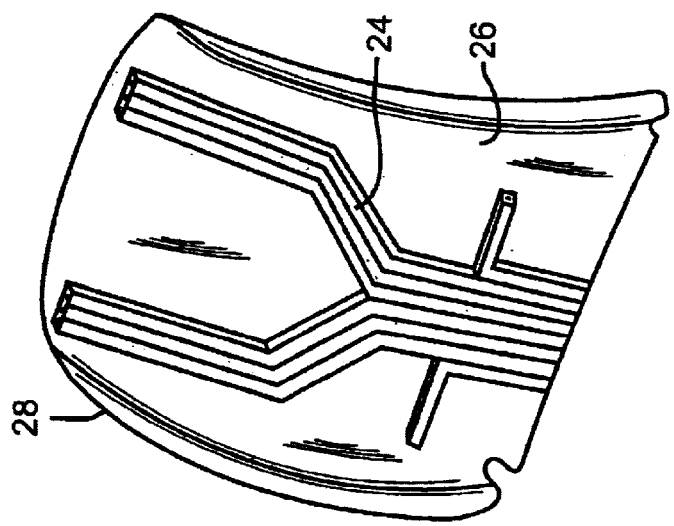
FIG. 4 is a schematic perspective of a backrest module having conduits integrally formed therein.

In the embodiment shown in FIG. 4, conduits or channels 24 can be integrally formed in an alternate embodiment of a cover 28. The cover 28 can be similar to the cover module 10. The channels 24 can be formed as a recess to retain electrical wiring, hydraulic or pneumatic fluid lines, or ventilation lines. One of the advantages of using integral channels 24 is the reduction of noise and vibration compared with running and attaching wires, wire harnesses, or tubes along a flat panel. The channels 24 could also be formed as passageways for transmitting air or fluid. Also, a wiring circuit can be integrally formed on the cover 28 by spraying an electrically conductive material to form a circuit path onto the surface of the cover 28.

Figure 5:
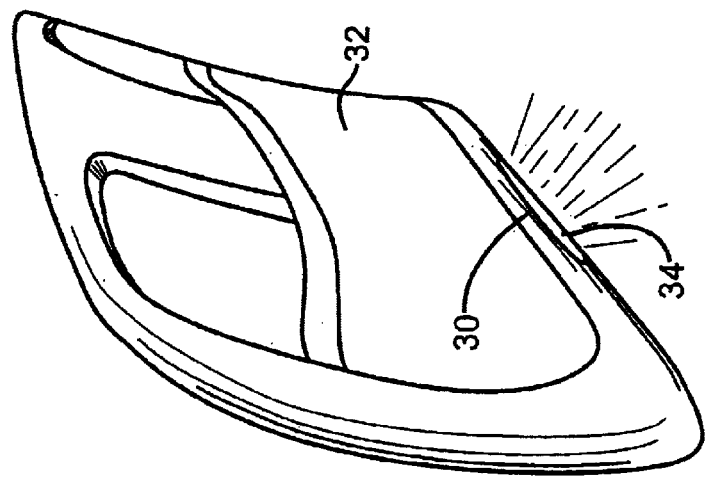
FIG. 5 is a schematic perspective of a backrest module having a light assembly mounted therein.

In the embodiment shown in FIG. 5, a lighting assembly 30 for the leg area of the back of the vehicle is preassembled in an alternate embodiment of a backrest cover 32. The lighting assembly 30 may include a light socket, wiring, a light bulb, and a translucent cover 34, all of which can be preassembled on the backrest cover 32 prior to installation of the cover 32 onto a seat frame. Any type of lighting device can be preassembled on the backrest cover 32.

Figure 7:
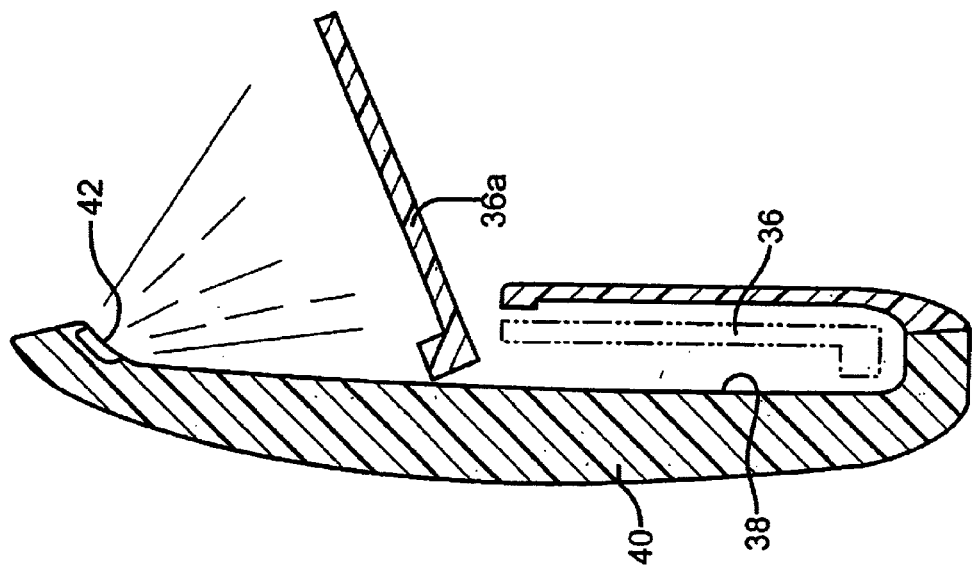
FIG. 7 is a schematic side view of the backrest module of FIG. 6.
Figure 6:
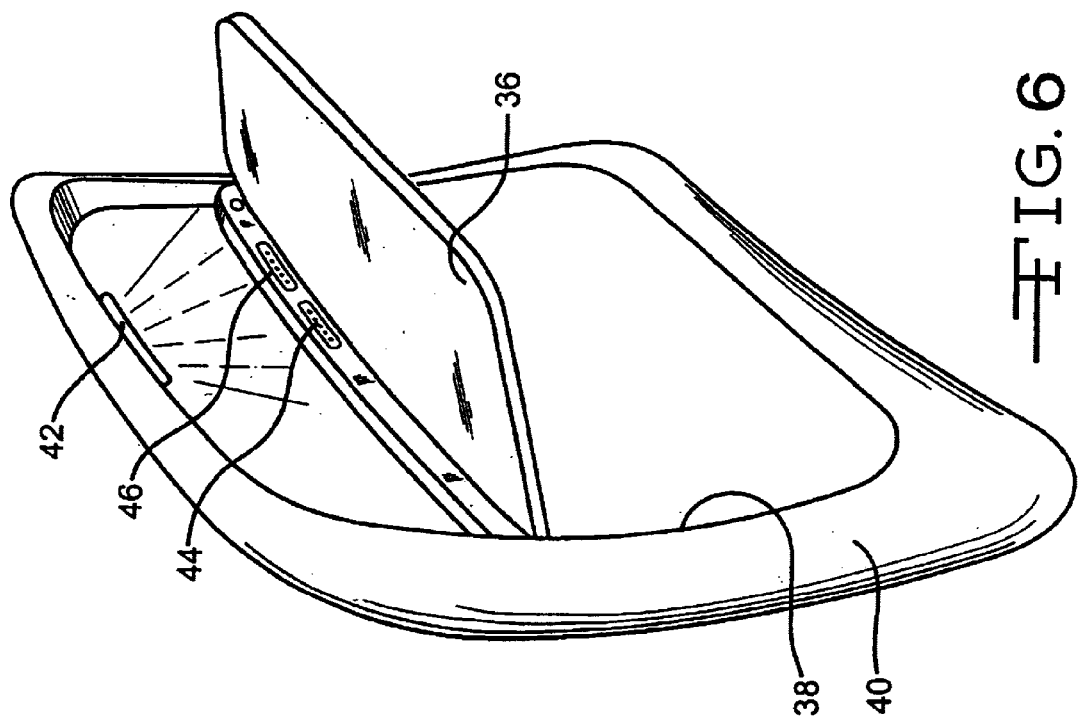
FIG. 6 is a schematic perspective of a backrest module having a pivoting tray mounted thereon.

In the embodiment shown in FIGS. 6 and 7, a tray 36 is preferably pre-assembled in a recess 38 in the backrest cover 40. The tray 36 is preferably mounted on guide rails (not shown) along the sides of the recess 38, and it can be pulled up and oriented in a generally horizontal position, as shown in FIG. 7 at 36a. Alternatively, the tray 36 could be hinged to the backrest cover 40 along the inner edge of the tray 36. Any type of tray or other platform can be preassembled on the backrest cover 40. In the illustrated embodiment, a lighting assembly 42 is also preassembled on the backrest cover 40, at the top of the recess 38. The lighting assembly 42 provides lighting for the tray 36. A pair of electrical connections 44 and 46 are also preassembled on the backrest cover 40. The electrical connections 44 and 46 can be used for any purpose, such as for mobile telephone and computer connections. Any type and number of electrical connections can be preassembled on the backrest cover 40. Preferably, the cover 40 is similar to the module 10 and is relatively stiff to provide support for the tray 36. Conventional flimsy covers of conventional seat backs would not be able to support a tray and its contents, and therefore, would need extra support added thereto, thereby increasing the costs and weight of the seat back. The present invention utilizes the strength and stiffness of the cover to not only provide strength to the seat back but to provide support for a tray 36.

Figure 8:
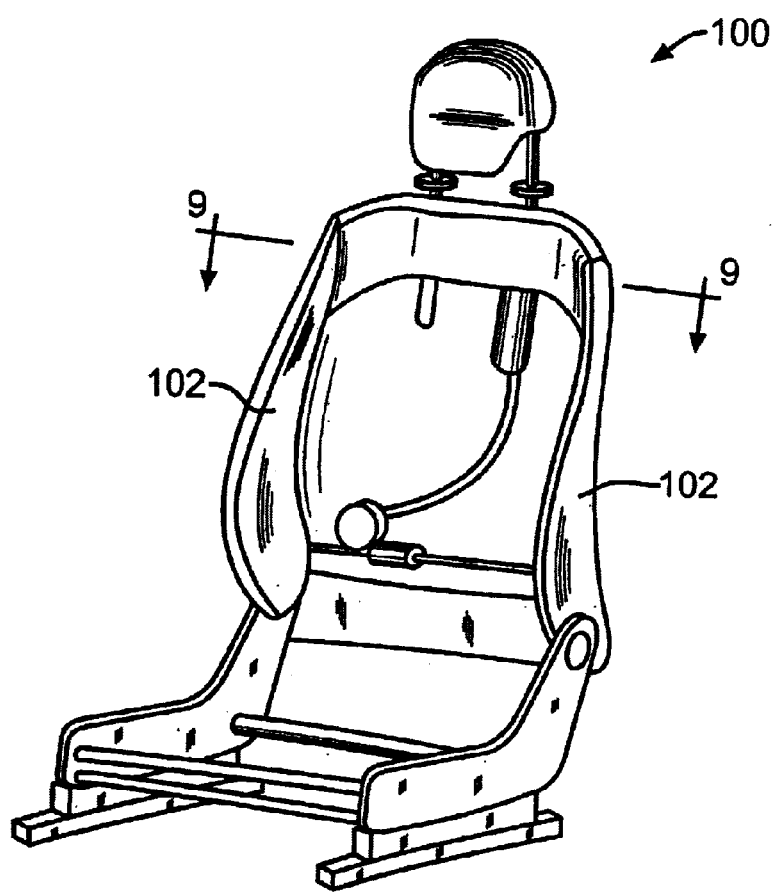
FIG. 8 is a schematic perspective view of a seat frame which may be used with the backrest modules of the present invention.
Figure 9:
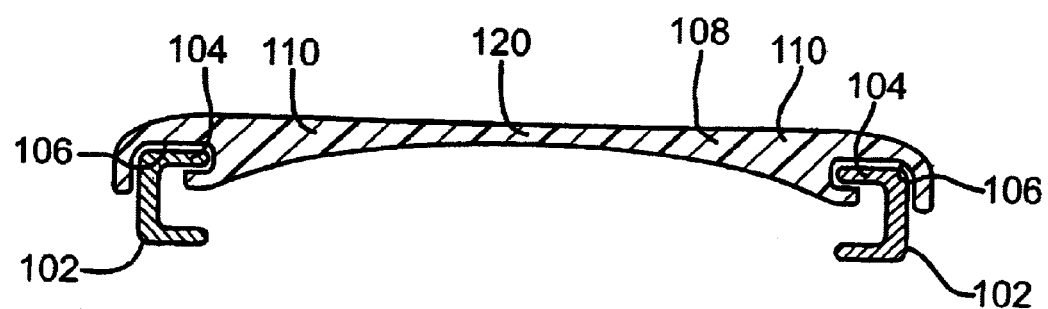
FIG. 9 is a schematic cross-sectional view of the seat frame of FIG. 8 having a backrest module mounted thereon.

There is illustrated in FIG. 8 a seat frame, indicated generally at 100, which can include the features of the seat modules, covers, and cross members shown and described with respect to FIGS. 1 through 7. As shown in FIGS. 8 and 9, the seat assembly 100 includes a pair of spaced apart vertical side members 102 preferably having a generally C-shaped cross-section. The side members 102 can be made of metal formed from a stamping process. Rear legs 104 of the side members 102 are received in recesses 106 formed in a cover 108, such as one of the cover modules described above and shown herein, to help improve the rigidity of the side members 102 and especially torsional strength or rigidity. Preferably, the cover 108 has a relatively large thickness to add structural rigidity to the seat back. As shown in FIG. 9, the width of the cover is oversized and the lateral edges of the cover include integral fastening structures which partially surrounds the side members 102 for attaching the cover to the side rails. Lateral edges 110 of the cover 108 can have a thickness which is greater than the thickness in a central portion 120 to provide increased strength at desired locations.

As stated above, the cover can include various vehicle components pre-assembled on the cover. Other examples of components include integral housings for electronic controls for power seats, air curtains, lumbar and bolster seat drive mechanisms. The cover can also include self aligning head rest mechanisms which advance the headrest in a forward direction upon detection of an impact to reduce the distance between an occupant head and the headrest to help reduce whiplash injuries. The cover can also include energy absorbing structures, such as foam pads or integral breaking cells which deform to absorb energy.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat back comprising:
   a vehicle frame assembly having a pair of generally vertically oriented side rails;
   a cover extending between the side rails of the seat back; and
   a metallic cross member integrally molded into said cover, wherein said cover and cross member cooperate to provide structural rigidity to the seat back.

2. The seat back of claim 1, wherein said cover is made of plastic.

3. The seat back of claim 1, wherein said cross member is integrally molded into an upper portion of said cover.

4. The seat back of claim 1, wherein a plurality of components are pre-assembled on said cover.

5. The seat back of claim 4, wherein said plurality of components includes a fluid bladder.

6. The seat back of claim 5, wherein said fluid bladder is housed in said cross member.

7. The seat back of claim 4, wherein said plurality of components includes a lighting fixture.

8. The seat back of claim 4, wherein said plurality of components includes a tray table.

9. The seat back of claim 1, wherein said cover includes integral fastening structures for attaching said cover to the side rails of the seat frame.

10. The seat back of claim 1, wherein said cross member has a portion having a generally C-shaped cross-section.

11. The seat back of claim 1, wherein said cross member includes apertures formed therein for receiving posts for mounting a headrest thereon.

12. The seat back of claim 1 further including a self aligning head rest mechanism for advancing a headrest in a forward direction upon detection of an impact to reduce the distance between an occupant head and said headrest.

13. The seat back of claim 1, wherein said cover includes a conduit.

14. The seat back of claim 13, wherein said conduit is integrally formed in said cover.

15. A method of assembling a vehicle seat back comprising:
  a. providing a vehicle frame assembly having a pair of generally vertically oriented separate side rails;
  b. providing a cover having a metallic rigid cross member integrally formed therein; and
  c. attaching the cover to the vehicle frame assembly such that the cover extends between the side rails and the cross member provides structural rigidity to the vehicle seat back.

* * * * *